United States Patent
Pong

(10) Patent No.: US 7,852,851 B2
(45) Date of Patent: Dec. 14, 2010

(54) METHOD AND SYSTEM FOR HASH TABLE BASED ROUTING VIA A PREFIX TRANSFORMATION

(75) Inventor: Fong Pong, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 469 days.

(21) Appl. No.: 11/776,652

(22) Filed: Jul. 12, 2007

(65) Prior Publication Data

US 2008/0112412 A1    May 15, 2008

Related U.S. Application Data

(60) Provisional application No. 60/865,369, filed on Nov. 10, 2006.

(51) Int. Cl.
H04L 12/28 (2006.01)
H04L 12/56 (2006.01)

(52) U.S. Cl. .................. 370/395.32; 370/389; 711/216

(58) Field of Classification Search .............. 714/781; 726/22; 708/400, 401; 707/101; 711/108, 711/216; 370/395.32, 392, 477, 400, 401, 370/395.54, 466, 255, 351; 709/245, 238, 709/201, 203

See application file for complete search history.

(56) References Cited

U.S. PATENT DOCUMENTS

| | | | | |
|---|---|---|---|---|
| 6,442,617 B1 * | 8/2002 | Lowe et al. | ................... | 709/250 |
| 6,611,832 B1 * | 8/2003 | van Lunteren | .................. | 707/3 |
| 6,690,667 B1 * | 2/2004 | Warren | ........................ | 370/389 |
| 6,735,670 B1 * | 5/2004 | Bronstein et al. | ........... | 711/108 |
| 7,437,354 B2 * | 10/2008 | Venkatachary et al. | .............. | 1/1 |
| 7,483,430 B1 * | 1/2009 | Yuan et al. | ................ | 370/395.2 |
| 7,565,343 B2 * | 7/2009 | Watanabe | ........................... | 1/1 |
| 2002/0069232 A1 * | 6/2002 | Direen et al. | ................ | 708/400 |
| 2003/0050762 A1 * | 3/2003 | Hatley | ......................... | 702/122 |
| 2005/0108617 A1 * | 5/2005 | Lappin, Jr. | ................... | 714/781 |
| 2005/0195832 A1 * | 9/2005 | Dharmapurikar et al. | ...................... | 370/395.31 |
| 2006/0179071 A1 * | 8/2006 | Panigrahy et al. | ........... | 707/101 |
| 2006/0200581 A1 * | 9/2006 | Cadambi et al. | ............ | 709/245 |
| 2007/0150795 A1 * | 6/2007 | King et al. | ................... | 714/781 |

* cited by examiner

*Primary Examiner*—Michael J Moore, Jr.
(74) *Attorney, Agent, or Firm*—McAndrews, Held & Malloy, Ltd.

(57) ABSTRACT

Aspects of a method and system for hash table based routing via prefix transformation are provided. Aspects of the invention may enable translating one or more network addresses as a coefficient set of a polynomial, and routing data in a network based on a quotient and a remainder derived from the coefficient set. In this regard, the quotient and the remainder may be calculated via modulo 2 division of the polynomial by a primitive generator polynomial. In one example, the remainder may be calculated with the aid of a remainder table. The primitive generator polynomial may be $x^{16}+x^8+x^6+x^5+x^4+x^2+1$. Additionally, entries in one or more hash tables may comprise a calculated quotient and may be indexed by a calculated remainder. In this manner, the hash tables may be accessed to determine a longest prefix match for the one or more network addresses. The hash tables may comprise $2^{deg(g(x))}$ sets, where $deg(g(x))$ is the degree of the primitive generator polynomial. Accordingly, the hash tables may be set associative and multiple entries may be indexed by the same remainder. Furthermore, entries in the hash tables may comprise a next hop address utilized in routing network traffic.

27 Claims, 7 Drawing Sheets

* $z = \text{minimum}((2^{\deg(g(x))}-1), (2^{\text{length(prefix)}} - 1))$

METHOD AND SYSTEM FOR HASH TABLE BASED ROUTING VIA A PREFIX TRANSFORMATION

CROSS-REFERENCE TO RELATED APPLICATIONS/INCORPORATION BY REFERENCE

This patent application makes reference to, claims priority to and claims benefit from U.S. Provisional Patent Application Ser. No. 60/865,369 filed on Nov. 10, 2006.

This application also makes reference to:

U.S. patent application Ser. No. 11/776,660 filed on even date herewith;

Each of the above stated applications is hereby incorporated herein by reference in its entirety.

FIELD OF THE INVENTION

Certain embodiments of the invention relate to data processing. More specifically, certain embodiments of the invention relate to a method and system for hash table based routing table via a prefix transformation.

BACKGROUND OF THE INVENTION

As the number of devices connected to data networks increase and higher data rates are required, there is a growing need for new technologies enabling higher transmission rates. In this regard, various efforts exist, including technologies that enable transmission rates that may even exceed Gigabits-per-second (Gbps) data rates. For example, the IEEE 802.3 standard defines the (Medium Access Control) MAC interface and physical layer (PHY) for Ethernet connections at 10 Mbps, 100 Mbps, 1 Gbps, and 10 Gbps data rates over twisted-pair copper cabling. Accordingly, as data rates increase due to widespread deployment of 1 Gbps and 10 Gbps Ethernet switches, fast IP address lookups have become indispensable for core and edge routers. Meanwhile, the number of prefixes in core routers has experienced explosive growth, with the largest border gateway protocol (BGP) routing table seeing, for example, a 40% surge in number of prefixes in a 12-month period. Earlier solutions to IP address lookups were tries-based through software execution to match an IP address progressively a few bits at a time against. In this regard, prefixes were stored in a tree-like data structure to support longest prefix matching (LPM), which chooses the longest prefix among those which matches the given IP address.

In contrast, hash tables offer an attractive method for fast IP lookups because of their constant-time search latencies. Hash tables are also attractive because they can be implemented in regular SRAM rather than TCAM. SRAM may be preferred over TCAM because SRAM is less expensive, more power efficient, and exhibits higher densities than TCAM.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for hash table based routing via a prefix transformation, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for hash table based routing via a prefix transformation.

Aspects of the invention may enable translating one or more network addresses as a coefficient set of a polynomial, and routing data in a network based on a quotient and a remainder derived from the coefficient set. In this regard, the quotient and the remainder may be calculated via modulo 2 division of the polynomial by a primitive generator polynomial. In one example, the remainder may be calculated with the aid of a remainder table. The primitive generator polynomial may be $x^{16}+x^8+x^6+x^5+x^4+x^2+1$. Additionally, entries in one or more hash tables may comprise a calculated quotient and may be indexed by a calculated remainder. In this manner, the hash tables may be accessed to determine a longest prefix match for the one or more network addresses. The hash tables may comprise $2^{deg(g(x))}$ sets, where $deg(g(x))$ is the degree of the primitive generator polynomial. Accordingly, the hash tables may be set associative and multiple entries may be indexed by the same remainder. Furthermore, entries in the hash tables may comprise a next hop address utilized in routing network traffic.

Figure 1:
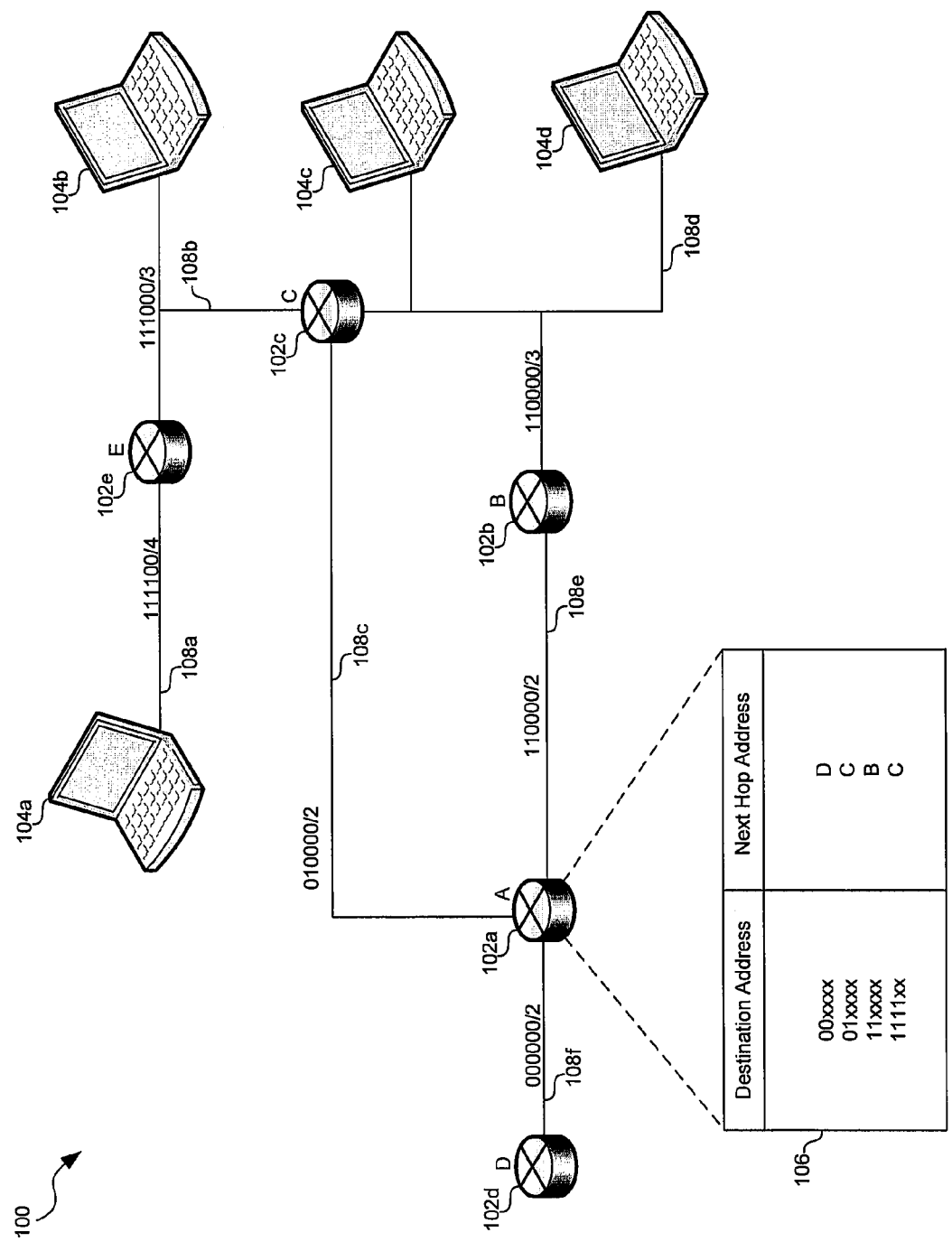
FIG. 1 is diagram of a network illustrating longest prefix matching, in connection with an embodiment of the invention.

FIG. 1 is diagram of a network illustrating longest prefix matching, in connection with an embodiment of the invention. Referring to FIG. 1, the network 100 may comprise a plurality of sub-networks 108, a plurality of routers 102, a plurality of end systems 104. The routing table 106 comprising the router 102a is also shown. For simplicity, nodes connected to the network 100 are addressed utilizing a 6-bit address.

The sub-networks 108 may comprise logical connections identified by common bits comprising the 6-bit addresses associated with nodes connected to each sub-network. In this regard, each sub-network may be identified by 2 or more bits common to the nodes connected to it, where the number of bits is indicated following a slash. For example, the sub-network 108e may comprise nodes having 6-bit addresses beginning with '11$_b$'. Similarly, the sub-network 108a may couple nodes having 6-bit address beginning with '111$_b$'.

The end systems 104 may comprise suitable logic, circuitry, and/or code that may enable transmission and/or reception of data via a network interface. In this regard, each of the end systems 104 may be assigned a unique address to identify them to other nodes comprising the network 100. The address of each of the end systems 104 may be assigned based on the sub-network to which each is connected. For example, the end-system 104a may be assigned a 6-bit address ranging from '11101$_b$' to '111111$_b$'.

The routers 102 may comprise suitable logic circuitry, and/or code that may enable reception of data via a plurality of network interfaces and forwarding of data onto a plurality of network interfaces. In this regard, each router 102 may, for example, enable data transmitted by the end system 104a to traverse the network 100 and arrive at the end system 104d. In this regard, each network interface comprising each of the routers 102 may be assigned a 6-bit address. Each of the routers 102 may utilize a routing table such as the routing table 106 to enable the forwarding of data in the network 100.

In an exemplary routing operation, a packet may arrive at the router 102a destined for '111011$_b$' (a node connected to the sub-network 108b). In order to forward this packet, the router 102a may determine the longest prefix comprising the table 106 that matches the destination address of '111011$_b$'. In this regard, a match is found in '11xxxx$_b$' and the packet may be forwarded to node B (router 102b).

In another exemplary routing operation, a packet may arrive at the router 102a destined for '111101$_b$' (a node connected to the sub-network 108a). In order to forward this packet, the router 102a may determine longest prefix comprising the table 106 that matches the destination address of '111101$_b$'. In this regard, a match is found in '111xx$_b$' and the packet is forwarded to node C (router 102c).

Figure 2:
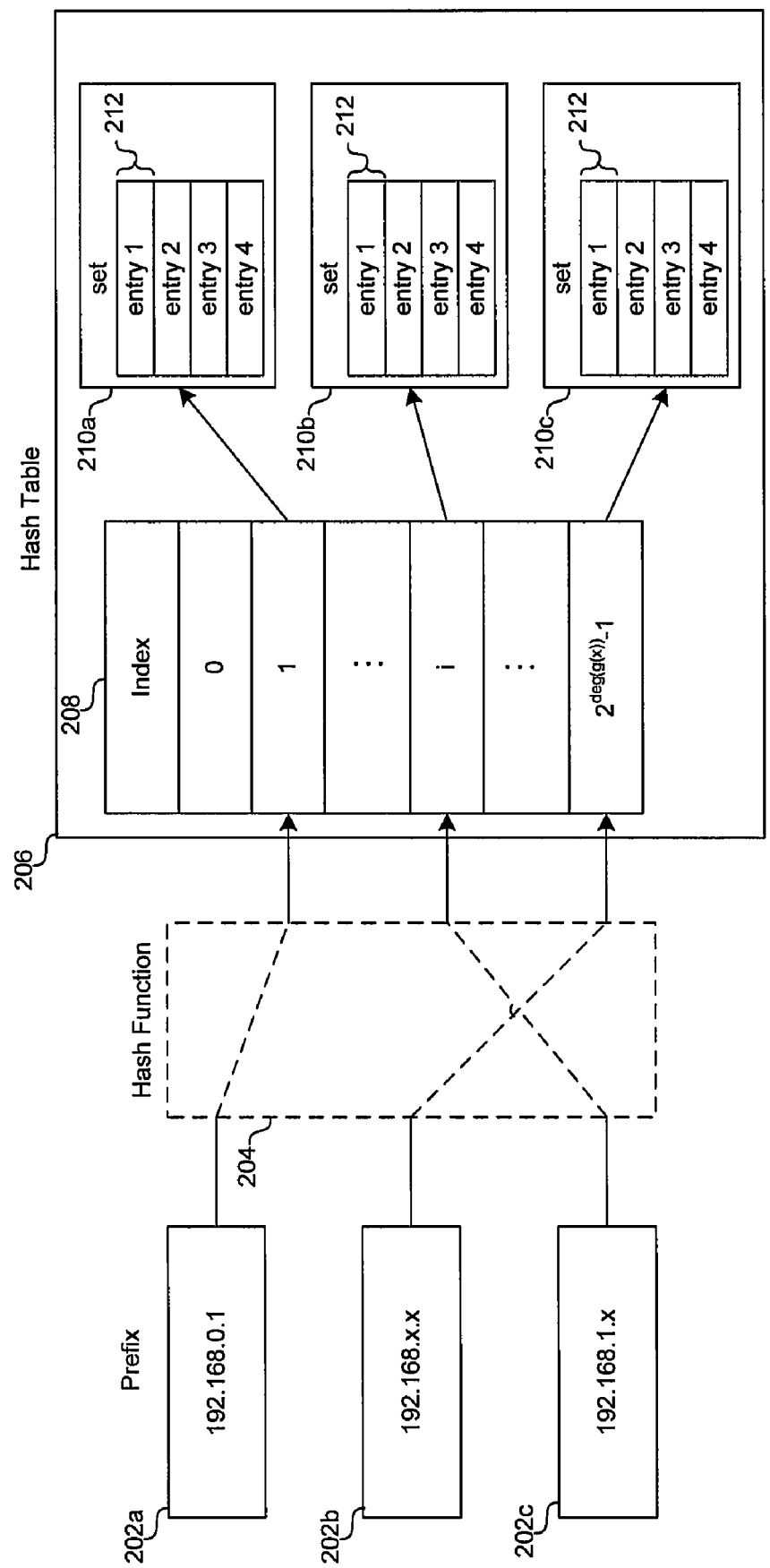
FIG. 2 illustrates a set-associative hash table indexed by a hash function that operates on network addresses, in accordance with an embodiment of the invention.

FIG. 2 illustrates a set-associative hash table indexed by a hash function that operates on network addresses, in accordance with an embodiment of the invention. Referring to FIG. 2, each prefix 202 may be mapped to an index 208 of hash table 206 via a hash function 204. Each index 208 may correspond to a set 210 comprising one or more entries 212. In one embodiment of the invention, the table may be 4-way set-associative and thus each set 210 may comprise up to 4 entries 212.

The prefixes 202 may each represent an IP address or a network portion of an IP address. In this regard, the prefixes 202 may, for example, each be 8 to 32 bits long for IPv4. Accordingly, up to 25 hash functions may be utilized to hash the prefixes 202 to an index 208.

The hash table 206 may comprise suitable logic, circuitry, and/or code that may enable storage of prefix representations. In this regard, the hash table 206 may be implemented in one or more RAM blocks, for example.

The hash function 204 may operate to hash a prefix to an index. Details of an exemplary hashing operation and associated prefix transformation are described herein. In this regard, a prefix 202 may be hashed to an index by translating the prefix as a coefficient set of a polynomial, p(x), defined over the Galois Field GF(2), and dividing it by a primitive generator polynomial, g(x), to obtain a quotient, q(p/g), and a remainder, r(p/g). In this regard, the coefficients may be binary numbers and arithmetic may be performed modulo 2. The polynomial p(x) may be uniquely defined by the set (q(p/g), r(p/g)), and thus a prefix may be represented in the hash table 206, with no loss of information, by storing q(p/g) in a set indexed by r(p/g). In this regard, the hash table 206 may comprise $2^{deg(g(x))}$ sets, where deg(g(x)) denotes the degree of the generator polynomial g(x). Accordingly, for a prefix of length 'w', q(p$_w$/g) may be up to (w−deg(g(x))) bits long. Similarly, r(p$_w$/g) may be up to deg(g(x)) bits long. For example, if g(x) is of degree 16, then a 32 bit (24 bit) prefix may result in a 16 bit remainder and a 16 bit (8 bit) quotient. In this example, one or more entries 212 of the table 210 may comprise only the 16 bit (8 bit) quotient rather than the complete 32 bit (24 bit) prefix. In this manner, a significant savings in memory required to store each entry 212, and thus the memory required to store the table 206, may be realized by transformation of prefixes into a quotient and a remainder.

Although choice of a proper generator polynomial may limit the occurrence of collisions, no hash function may be perfect and collisions may occur. In this regard, an associative degree of the table may be determined based on theoretical or empirically determined expectance of collisions. For example, as shown in FIG. 2, in various embodiments of the invention, a 4-way set-associative table may be determined to be sufficient. Moreover, a small spillover RAM or TCAM may be utilized to handle the rare instances when more than 4 prefixes hash to the same index.

Figure 3:
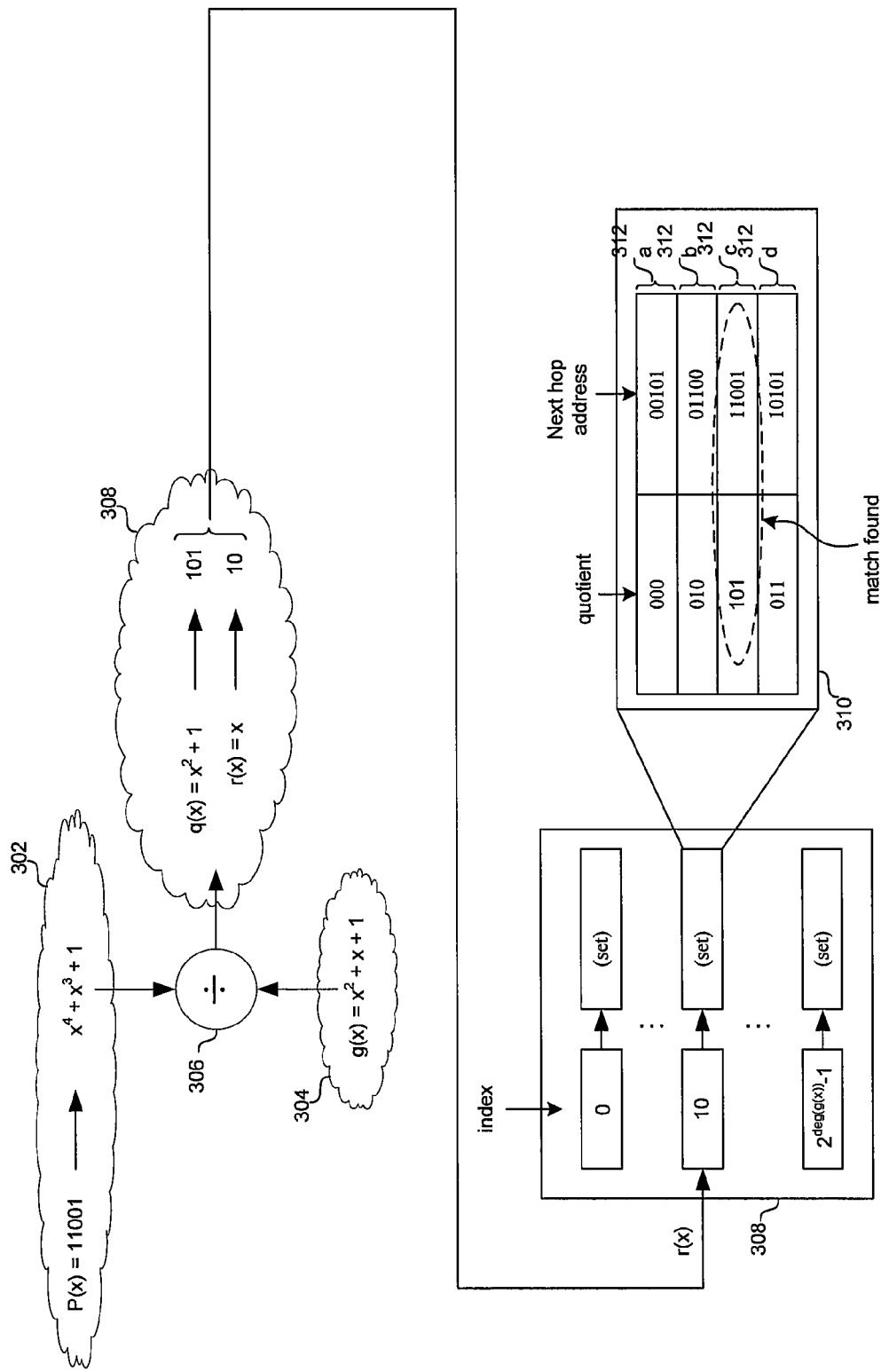
FIG. 3 is a diagram illustrating an exemplary prefix transformation for a hash table based address lookup, in accordance with an embodiment of the invention.

FIG. 3 is a diagram illustrating an exemplary prefix transformation for a hash table based address lookup, in accordance with an embodiment of the invention. Referring to FIG. 3, there is shown an exemplary prefix 302, an exemplary generator polynomial 304, a binary division block 306, a quotient and remainder pair 308 output by the binary division block 306, a hash table 308, and a set 310 comprising the hash table 308. The set 310 comprises a plurality of entries 312.

In an exemplary embodiment of the invention, the prefix 302 may comprise a 5-bit binary number and the generator polynomial may be '$x^2+x+1$'. As shown, the prefix '11001$_b$' may be translated as the coefficient set of a polynomial '$x^4+x^3+1$'. In this regard, although a prefix of 5 bits is utilized for illustration, the invention is not limited in regard to length and/or value of p(x) or g(x). In this manner, p(x) may depend on a number of network parameters and a choice of g(x) may, in turn, depend on the possible lengths and/or values of p(x).

Figure 4:
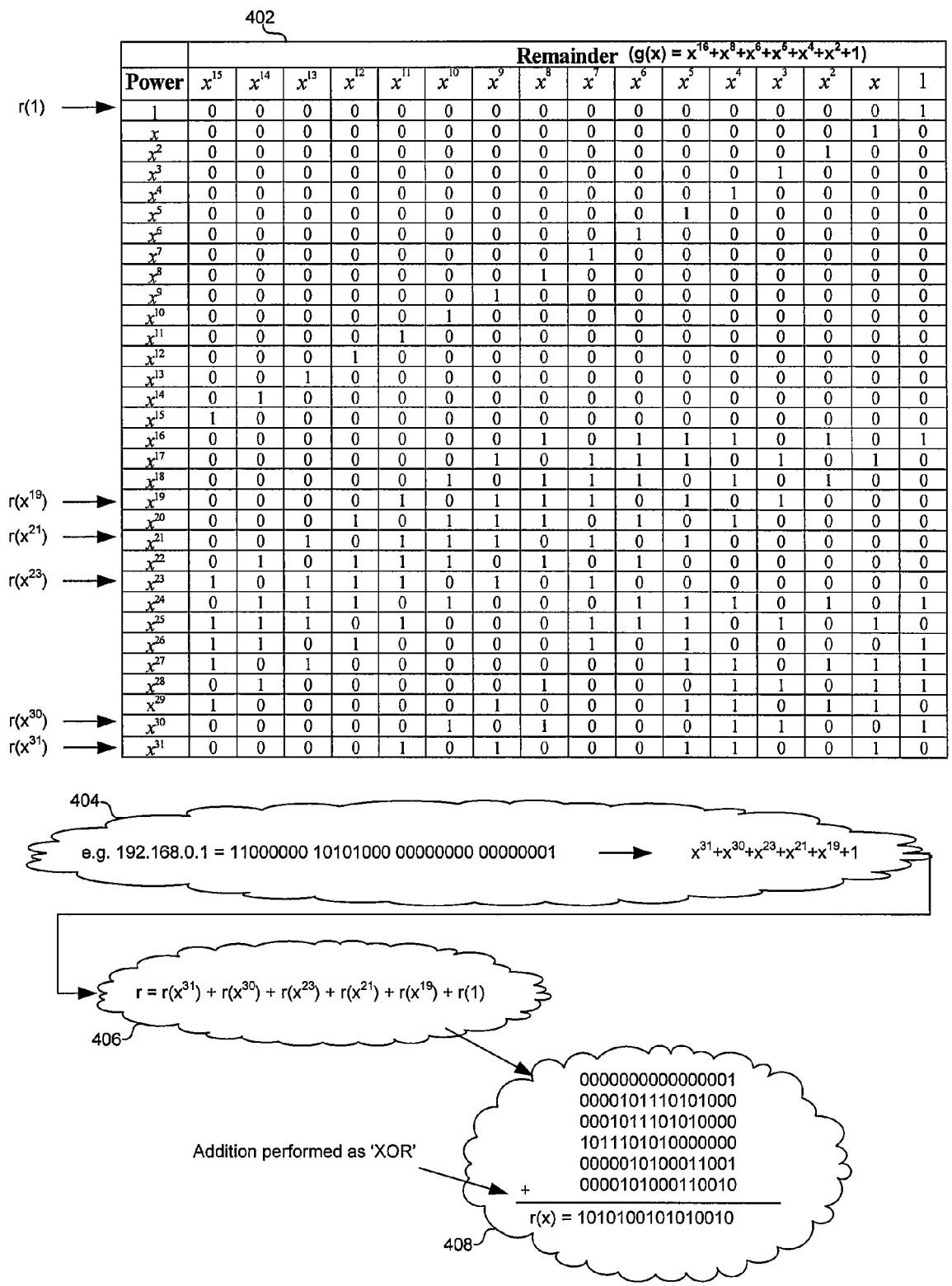
FIG. 4 illustrates a look-up table based calculation of a remainder resulting from a division of polynomials, in accordance with an embodiment of the invention.

The binary division block 306 may comprise suitable logic, circuitry, and/or code that may enable modulo 2 division of p(x) by g(x). In this regard, a number of algorithms may be utilized to calculate q(p/g) and r(p/g). For example, r(p/g) may be quickly obtained utilizing a look up table. In this regard, an exemplary remainder table for $g(x)=x^{16}+x^8+x^6+x^5+x^4+x^2+1$ is disclosed in FIG. 4. A remainder table as illustrated in FIG. 4 may be utilized since the remainder from a division of a sum of polynomials is equal to the sum of the remainders from a division of each polynomial.

In various aspects of the invention, after r(p/g) is obtained, access to the hash table 208 may begin, thereby hiding the latency of calculating q(p/g). In this regard, q(p/g) may be 0 for any prefix of length less than or equal to deg(g(x)). Additionally, for a prefix longer than deg(g(x)) bits, q(p/g) may be obtained utilizing the following algorithm for binary division. Given an initial dividend polynomial p(x) (represented by its coefficient set={p$_{m-1}$, p$_{m-2}$, . . . , p$_0$}) and a divider g(x) (represented by its coefficient set={g$_{n-1}$, g$_{n-1}$, . . . g$_0$}), there may be a plurality of possibilities at each computation stage: If the leftmost bit of p(x) is 0, p(x) is shifted to the left by one position. The quotient q(p/g) is shifted to the left, appended by a value of 0; and if the left-most bit of ψ(x) is 1, an XOR is performed between p(x) and q(p/g). Then, p(x) is shifted to the left by one position. The quotient q(p/g) is shifted to the left, appended by a value of 1. The following sequence of events illustrates an example of (x6+x3+x2+x)/(x3+x+1):

TABLE 1

| Step | q(p/g) | p(x) | | g(x) |
|---|---|---|---|---|
| 0 | | 1001110 | ⊕ | 1011 |
| 1 | 1 | 10110 | | 1011 |
| 2 | 10 | 10110 | ⊕ | 1011 |
| 3 | 101 | 0000 | | 1011 |
| 4 | 1010 | 000 | | 1011 |

The above scheme gives rise to one resulting bit per cycle. Accordingly, to obtain q(p/g) for a prefix of 32 bits, it may take deg(g(x)) cycles. In this regard, although the latency of calculating q(p/g) may be partially hidden by overlapping the calculation of q(p/g) with accessing the hash table based via r(p/g), it may be desirable to speed up the calculation of q(p/g). Accordingly, calculation of q(p/g) may be achieved by a modulo-2 arithmetic, as follows:

$$\phi(j+1) = F \cdot \phi(j) \oplus G \cdot \phi(j)_0, \quad \text{EQ. 1}$$

where $\phi(j)$ is the '$j^{th}$' state of the linear system for p(x), namely, the current dividend after the '$j^{th}$' subtraction and $\phi(j)_0$ denotes the one-bit shift-in serial input of current p(x), which is the first element of matrix $\phi(j)$ and also the resulting bit for q(p/g) after this step. Additionally, G is an ('m' by 1) matrix $[g_{n-2} \ldots g_0, 0, 0 \ldots 0]^T$, where the first ('n'−1) elements are from g(x), with $g_{n-1}$ unused. As shown in the above example, the left-most resulting bit after each subtraction is discarded due to the shift operation. Finally, F is an ('m' by 'm') matrix of $$F = \begin{bmatrix} 0 & 1 & 0 & 0 & 0 & \cdots & 0 & 0 \\ 0 & 0 & 1 & 0 & 0 & \cdots & 0 & 0 \\ 0 & 0 & 0 & 1 & 0 & \cdots & 0 & 0 \\ \cdots & \cdots & \cdots & \cdots & \cdots & \cdots & \cdots & \cdots \\ \cdots & \cdots & \cdots & \cdots & \cdots & \cdots & \cdots & \cdots \\ 0 & 0 & 0 & 0 & 0 & \cdots & 1 & 0 \\ 0 & 0 & 0 & 0 & 0 & \cdots & 0 & 1 \\ 0 & 0 & 0 & 0 & 0 & \cdots & 0 & 0 \end{bmatrix}$$

Eq. (1) implements an algorithm for a binary division. If $\phi(j)_0$ equals 0, only the shift operation is performed on $\phi(j)$ (by $F \cdot \phi(j)$). If $\phi(j)_0$ is 1, an XOR and a shift operation are performed between the two components. In a generic form, the solution for Eq. (1) is given by $$\phi(j) = F^{(j)} \cdot \phi(0) \oplus [F^{J-1} \cdot G, \ldots F \cdot G, G] \cdot [\phi(j-1)_0, \ldots \phi(0)_0]^T \quad \text{EQ. 2}$$

The preceding equation demonstrates the '$j^{th}$' state of the dividend related to the initial state and the inputs. In various embodiments of the invention, a parallel calculation of q(p/g) may be achieved by expanding Eq. (2) for the first 'k' bits of p(x). Then, the next batch of 'k' bits may be calculated via replacing $\phi(0)$ in the expression by $\phi(k)$. This accelerates the calculation of q(p/g) by a factor of 'k'. A value of 'k' such that, $2 \leq k \leq 4$ may be reasonable in light of the additional hardware cost. In the worst case when dividing a 32-bit prefix p(x) by a degree-16 g(x), it may take 8 (4) cycles when 'k' equals to 2 (4).

The hash table 308 may comprise suitable logic, circuitry, and/or code that may enable storage of prefix representations. In this regard, the hash table 308 may be implemented in one or more RAM blocks, for example. The hash table 308 may comprise indexes ranging from 0 to $2^{deg(g(x))}-1$. Each index comprising the hash table 308 may be associated with a set of entries, and each entry may, in turn, comprise a quotient and a next hop address. In this manner, prefixes may be uniquely represented as a quotient indexed by a remainder, as described in FIG. 2.

In the example depicted in FIG. 3, the binary division of p(x) by g(x) results in a quotient of '$101_b$' and a remainder of '$10_b$'. In the hash table 308, index '$10_b$' corresponds to the set 310. Accordingly, the quotient '$101_b$' may be compared to the quotient field comprising each of the entries 312 comprising the set 310. In this regard, a match is found in entry 312c and the next hop address is determined to be '$11001_b$'. In this manner, the transformation of the prefix into a quotient and remainder may enable storage of the 3-bit quotient rather than the full 5 bit prefix.

FIG. 4 illustrates a look-up table based calculation of a remainder resulting from a division of polynomials, in accordance with an embodiment of the invention. Referring to FIG. 4, the exemplary remainder table 402 is utilized to calculate the remainder of a division of '$p(x)=x^{31}+x^{30}+x^{23}+x^{21}+x^{19}+1$' by '$g(x)=x^{16}+x^8+x^6+x^5+x^4+x^2+1$'. In this regard, r(p/g) may hash the exemplary IP address 192.168.0.1 to an index comprising a hash table similar to the hash table 308 described in FIG. 3.

In operation, each term comprising p(x) is divided by g(x) to obtain a partial remainder and then all the partial remainders may be added to obtain r(p/g). In this regard, each partial remainder may be determined by looking up the result in a row corresponding to the term in the remainder table 402. Additionally, a modulo 2 addition may be performed by an exclusive-or operation. Although a specific g(x) is shown, a remainder table may be created for any generator polynomial.

Figure 5:
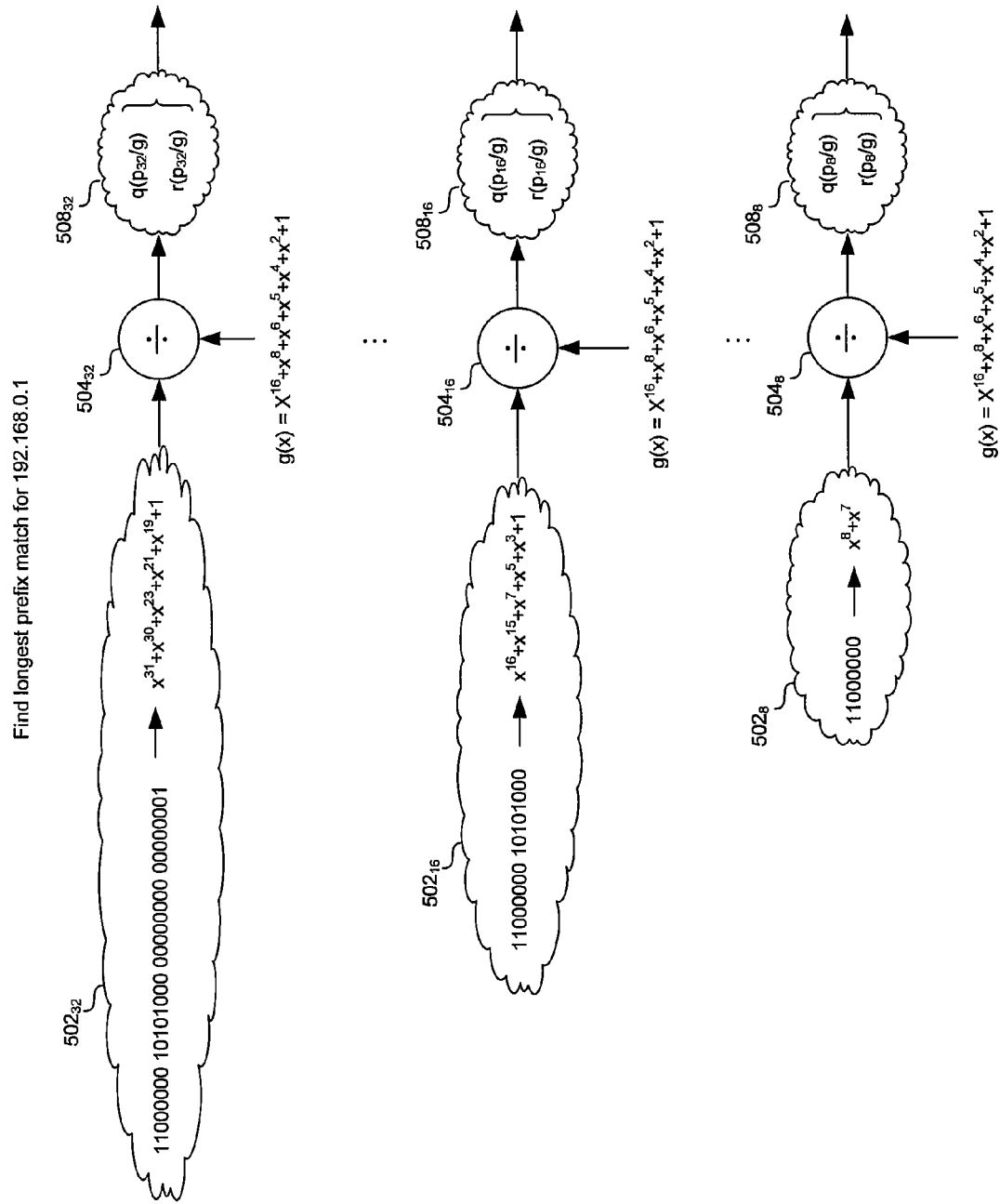
FIG. 5 illustrates prefix transformation of variable length prefixes for hash table based IP lookup, in accordance with an embodiment of the invention.

FIG. 5 illustrates prefix transformation of variable length prefixes for hash table based IP lookup, in accordance with an embodiment of the invention. Referring to FIG. 5 there is shown a plurality of prefixes 502 of variable length, a plurality of binary division blocks 504, and a plurality of quotient/remainder pairs 508.

The prefixes 502 may each represent a network portion of an exemplary IP address. In the exemplary embodiment of the invention shown, the prefixes 502 may represent a network portion of an IP address 192.168.0.1. In this regard, the network portion may vary in length from 8 bits to 32 bits and thus there may be 25 possible prefix matches for the address. Accordingly, a quotient $q(p_w/g)$ and a remainder $r(p_w/g)$ may be obtained by a division of $p_w(x)$ by g(x), where $p_w(x)$ represents a prefix of length 'w'. Although an exemplary IP address of 32 bits with 25 possible prefix lengths is used for illustration, the invention is not limited in this regard. Accordingly, the present invention may utilize network addresses and/or prefixes of any length with any number of possible prefix lengths.

The binary division blocks 504 may comprise suitable logic, circuitry, and/or code that may enable modulo 2 division of p(x) by g(x). Accordingly, a number of algorithms may be utilized to calculate q(p/g) and r(p/g). In this regard, each of the binary division blocks 504 may be similar to or the same as the binary division block 306 described in FIG. 3.

In operation, a longest prefix match may be determined for the exemplary IP address 192.168.0.1. To determine a longest prefix match, the address may be truncated to the 25 possible prefix lengths. Accordingly, 25 quotient/remainder pairs 508 may be calculated and a plurality of hash tables similar to the hash tables 208 or 308 may be accessed to find a longest prefix match. In this regard, aspects of the invention may enable a determination of whether an entry comprising $q(p_w/g)$ resides in a set indexed by $r(p_w/g)$. In this regard, a match may be found for multiple values of 'w', in which case the match with the highest value of 'w' may be the longest prefix match.

Figure 6:
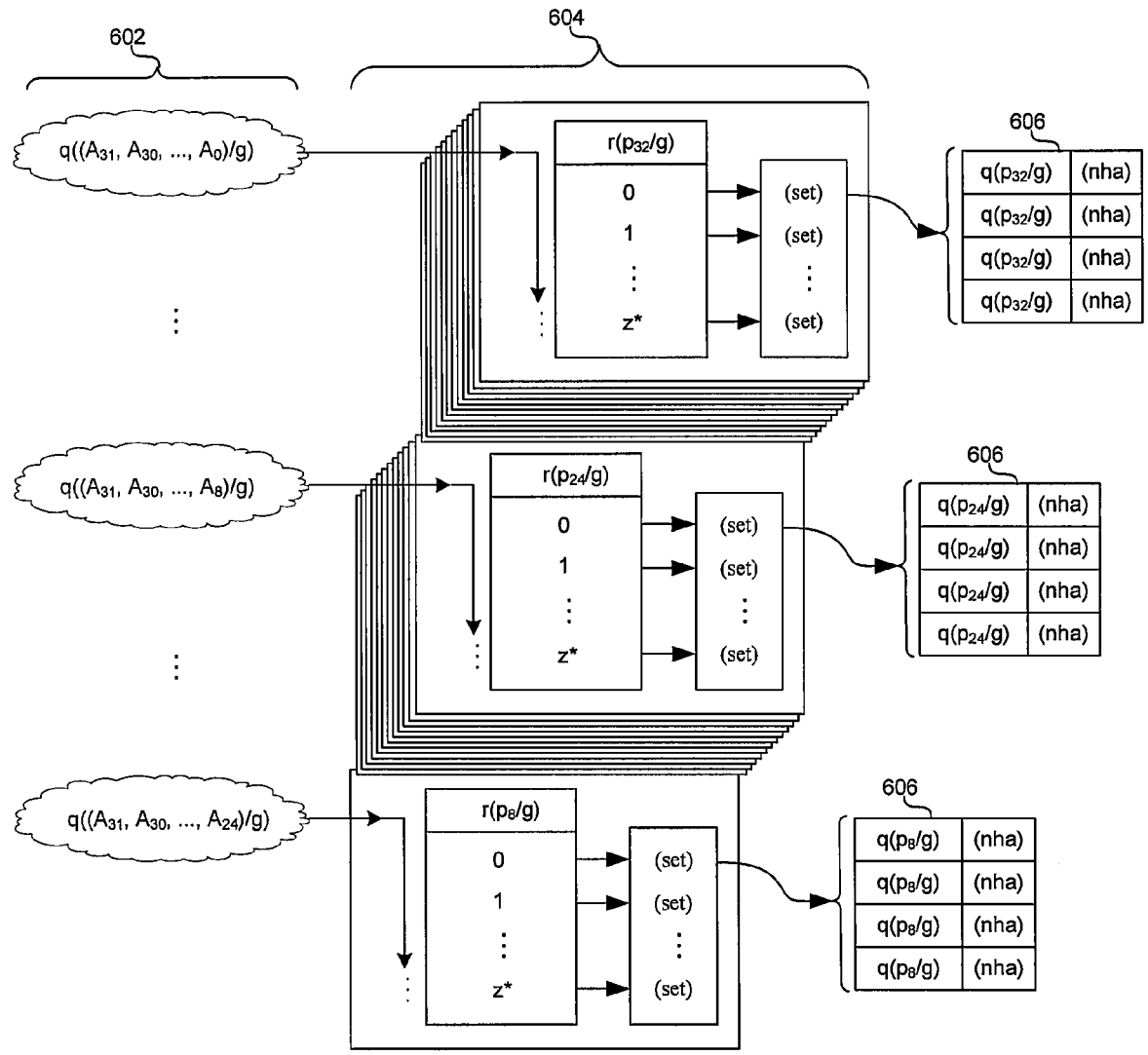
FIG. 6 is a diagram illustrating an exemplary hash table structure for longest prefix matching, in accordance with an embodiment of the invention.

FIG. 6 is a diagram illustrating an exemplary hash table structure for longest prefix matching, in accordance with an embodiment of the invention. Referring to FIG. 6 there is shown a plurality of prefixes 602, a plurality of hash tables 604, and a plurality of exemplary sets 606 comprising the hash tables 604.

The prefixes 602 may each represent a network portion of a network address for which a matching prefix is sought. In this regard, the prefixes 602 may be similar to the prefixes 502 described in FIG. 5. In the exemplary embodiment shown, the addresses may be IPv4 and there may be 25 possible prefix lengths.

Each of the hash tables 604 may comprise suitable logic, circuitry, and/or code that may enable storage of prefix representations. In this regard, each of the hash tables 604 may be implemented in one or more RAM blocks, for example. Each of the hash tables 604 may comprise indexes ranging from 0 to $(2^{deg(g(x))}-1)$. Each index comprising the hash tables 604 may be associated with a set of entries, and each entry may, in turn, comprise a quotient and a next hop address. In this manner, if each of the hash tables 604 represents prefixes of a single length, then prefixes may be uniquely represented as a quotient indexed by a remainder, as described in FIG. 2. Accordingly, the number of hash tables 604 may be equal to the number of possible prefix lengths 602. For example, for IPv4, as shown in FIG. 6, prefixes may range from 8 bits to 32 bits yielding a total of 25 possible prefix lengths. In this manner, 25 hash tables may be utilized to implement a hash table based IP address lookup. Moreover, if all tables are equal in size, as shown, then each table may store $(2^{deg(g(x))}-1)$ sets. Each set 606 comprising the tables 604 may comprise entries that all represent prefixes of a same length. Accordingly, to find a longest prefix match, 25 parallel searches of the hash tables 604 may be launched. In this manner, more than one match may be found and the longest prefix match may be determined based on the tables in which the matches are found.

Figure 7:
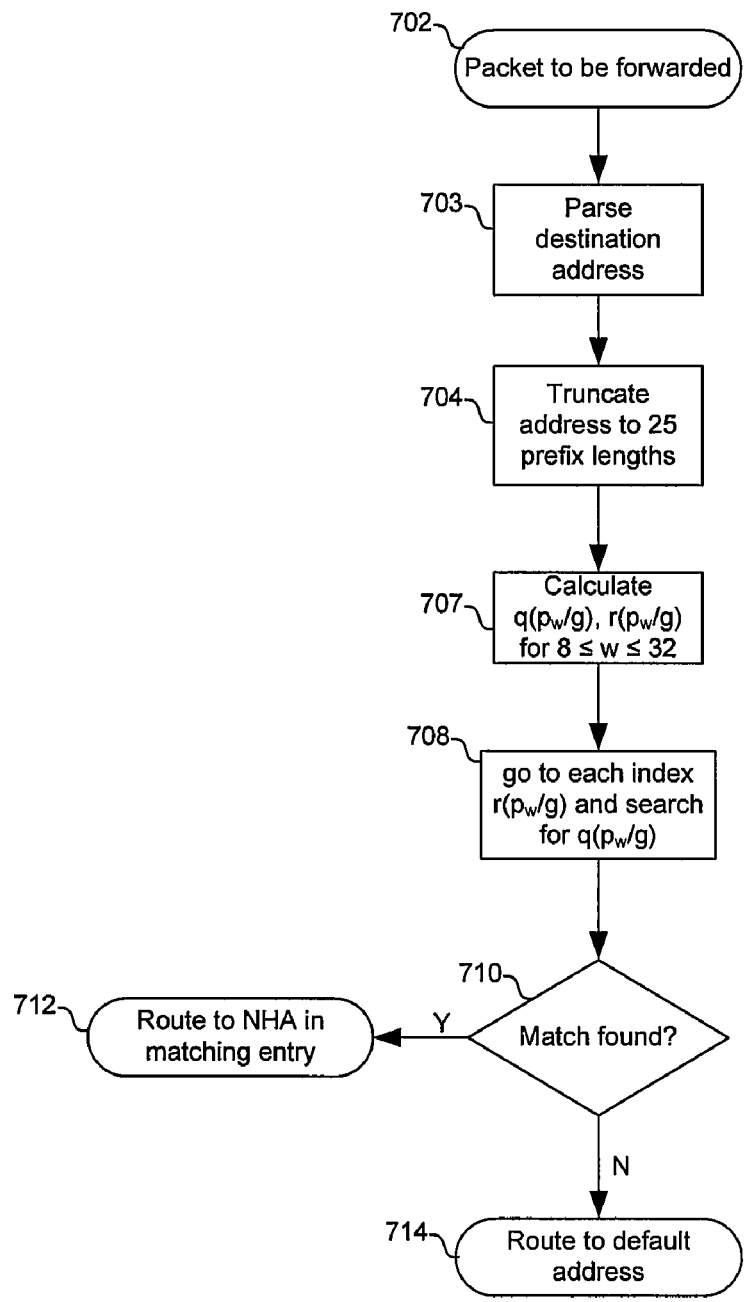
FIG. 7 is flow chart illustrating exemplary steps for hash table based IP lookup, in accordance with an embodiment of the invention.

FIG. 7 is flow chart illustrating exemplary steps for hash table based IP lookup, in accordance with an embodiment of the invention. Referring to FIG. 7, the exemplary step may begin with a step 702 when a packet is to be forwarded by a network node. Subsequent to step 702, the exemplary steps may advance to step 703. In step 703, the destination address of the packet may be determined. In this regard, the destination address may be determined, for example, by parsing a packet header. Subsequent to step 703, the exemplary steps may advance to step 704. In step 704 the destination address may be truncated to each of the possible prefix lengths. For example, in an IPv4 network there may be 25 possible prefix lengths ranging from 8 bits to 32 bits. Accordingly, aspects of the invention may enable searching for a match to each of the 25 possible prefixes. Subsequent to step 704, the exemplary steps may advance to step 706. In step 706, a quotient, $q(p_w/g)$, and remainder, $r(p_w/g)$ may be calculated for each prefix length. Subsequent to step 706, the exemplary steps may advance to step 708. In step 708, a number of tables equal to the number of possible prefix lengths may be accessed to determine if a match exists for any of the possible prefixes. In this regard, aspects of the invention may enable accessing a set for each index $r(p_w/g)$ and determining if an entry in the set comprises $q(p_w/g)$, where 'w' corresponds to the prefix length. Subsequent to step 708, the exemplary steps may advance to step 710. In step 710, it may be determined if a match for $q(p_w/g)$ has been found at the index $r_w(x)$. If a match is found, then the exemplary steps may proceed to step 712 and the packet may be forwarded to a next hop address comprising the matching hash table entry.

Returning to step 710, if a match is not found for $q(p_w/g)$ at an index of $r(p_w/g)$, then the exemplary steps may proceed to step 714. In step 714, the packet may be routed to a default address. For example, if a match is not found for any of the possible prefixes, then in step 716 the packet may, for example, be routed to a default router or be dropped.

Aspects of a method and system for hash table based Routing via prefix transformation are provided. Aspects of the invention may enable translating one or more network addresses as a coefficient set of a polynomial, as illustrated with the prefix 302 in FIG. 3, and routing data in a network based on a quotient and a remainder derived from the coefficient set. In this regard, the quotient and the remainder may be calculated via modulo 2 division of the polynomial by a primitive generator polynomial. The primitive generator polynomial may be $x^{16}+x^8+x^6+x^5+x^4+x^2+1$. In one example, the remainder may be calculated with the aid of a remainder table, such as the remainder table 402. Additionally, entries in one or more hash tables, such as the tables 308 and/or 604, may comprise a calculated quotient and may be indexed by a calculated remainder. In this manner, the hash tables may be accessed to determine a longest prefix match for the one or more network addresses. The hash tables may comprise $2^{deg(g(x))}$ sets, where $deg(g(x))$ is the degree of the primitive generator polynomial. Accordingly, the hash tables may be set associative and multiple entries may be indexed by the same remainder, as illustrated in the table 308. Furthermore, entries in the hash tables may comprise a next hop address utilized in routing network traffic.

Another embodiment of the invention may provide a machine-readable storage, having stored thereon, a computer program having at least one code section executable by a machine, thereby causing the machine to perform the steps as described herein for hash table based routing via prefix transformation.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed:

1. A method for processing data, the method comprising:
translating a network address as a plurality of coefficient sets of a corresponding plurality of polynomials;
deriving a plurality of quotient and remainder pairs from said plurality of coefficient sets;
accessing, in parallel, a plurality of hash tables;
determining a longest prefix match for said network address based on which of said hash tables return at least one match for at least one of said quotient and remainder pairs; and
routing data in a network based on said longest prefix match.

2. The method according to claim 1, comprising deriving said plurality of quotient and remainder pairs via modulo 2 division of said plurality of polynomials by a primitive generator polynomial.

3. The method according to claim 2, wherein said primitive generator polynomial comprises the polynomial $x^{16}+x^8+x^6+x^5+x^4+x^2+1$.

4. The method according to claim 1, wherein said plurality of hash-tables are set-associative.

5. The method according to claim 1, wherein each entry in said plurality of hash tables comprises a quotient, when said quotient is greater than 0.

6. The method according to claim 1, wherein each entry in said plurality of hash tables comprises a next hop address.

7. The method according to claim 1, wherein each of said plurality of hash tables comprises $2^{deg(g(x))}$ sets, where deg(g(x)) is the degree of said primitive generator polynomial.

8. The method according to claim 1, wherein multiple entries of each of said plurality of hash tables share a common index.

9. The method according to claim 1, wherein a remainder of one or more of said quotient and remainder pairs is calculated utilizing a remainder table.

10. A non-transitory computer readable medium having stored thereon, a computer program having at least one code section for processing data, the at least one code section being executable by a machine for causing the machine to perform steps comprising:
translating a network address as a plurality of coefficient sets of a corresponding plurality of polynomials;
deriving a plurality of quotient and remainder pairs from said plurality of coefficient sets;
accessing, in parallel, a plurality of hash tables;
determining a longest prefix match for said network address based on which of said hash tables return at least one match for at least one of said quotient and remainder pairs; and
routing data in a network based on said longest prefix match.

11. The non-transitory computer readable medium according to claim 10, wherein said at least one code section comprises code that enables deriving said plurality of quotient and remainder pairs via modulo 2 division of said plurality of polynomials by a primitive generator polynomial.

12. The non-transitory computer readable medium according to claim 11, wherein said primitive generator polynomial comprises the polynomial $x^{16}+x^8+x^6+x^5+x^4+x^2+1$.

13. The non-transitory computer readable medium according to claim 10, wherein said plurality of hash-tables are set-associative.

14. The non-transitory computer readable medium according to claim 10, wherein each entry in said plurality of hash tables comprises a quotient, when said quotient is greater than 0.

15. The non-transitory computer readable medium according to claim 10, wherein each entry in said plurality of hash tables comprises a next hop address.

16. The non-transitory computer readable medium according to claim 10, wherein each of said plurality of hash tables comprises $2^{deg(g(x))}$ sets, where deg(g(x)) is the degree of said primitive generator polynomial.

17. The non-transitory computer readable medium according to claim 10, wherein multiple entries of each of said plurality of hash tables share a common index.

18. The non-transitory computer readable medium according to claim 10, wherein a remainder of one or more of said quotient and remainder pairs is calculated utilizing a remainder table.

19. A system for data processing, the system comprising:
one or more processors that are operable to:
translate a network address as a plurality of coefficient sets of a corresponding plurality of polynomials;
derive a plurality of quotient and remainder pairs from said plurality of coefficient sets;
access, in parallel, a plurality of hash tables;
determine a longest prefix match for said network address based on which of said hash tables return at least one match for at least one of said quotient and remainder pairs; and
route data in a network based on said longest prefix match.

20. The system according to claim 19, wherein said one or more processors enable deriving said plurality of quotient and remainder pairs via modulo 2 division of said plurality of polynomials by a primitive generator polynomial.

21. The system according to claim 20, wherein said primitive generator polynomial comprises the polynomial $x^{16}+x^8+x^6+x^5+x^4+x^2+1$.

22. The system according to claim 19, wherein said plurality of hash-tables are set-associative.

23. The system according to claim 19, wherein each entry in said plurality of hash tables comprises a quotient, when said quotient is greater than 0.

24. The system according to claim 19, wherein each entry in said plurality of hash tables comprises a next hop address.

25. The system according to claim 19, wherein each of said plurality of hash tables comprises $2^{deg(g(x))}$ sets, where deg(g(x)) is the degree of said primitive generator polynomial.

26. The system according to claim 19, wherein multiple entries of each of said plurality of hash tables share a common index.

27. The system according to claim 19, wherein a remainder of each of said quotient and remainder pairs is calculated utilizing a remainder table.

* * * * *